US011790061B2

(12) United States Patent
Gonser et al.

(10) Patent No.: US 11,790,061 B2
(45) Date of Patent: *Oct. 17, 2023

(54) SYSTEM AND METHOD FOR IDENTITY AND REPUTATION SCORE BASED ON TRANSACTION HISTORY

(71) Applicant: DocuSign, Inc., San Francisco, CA (US)

(72) Inventors: Thomas H. Gonser, Alamo, CA (US); Donald G. Peterson, Kirkland, WA (US); Douglas P. Rybacki, Seattle, WA (US); Ashley Carroll, San Francisco, CA (US); Michael Strickland, San Francisco, CA (US)

(73) Assignee: DocuSign, Inc., San Francisco, CA (US)

(*) Notice: Subject to any disclaimer, the term of this patent is extended or adjusted under 35 U.S.C. 154(b) by 86 days.

This patent is subject to a terminal disclaimer.

(21) Appl. No.: 17/343,749

(22) Filed: Jun. 10, 2021

(65) Prior Publication Data

US 2021/0303664 A1   Sep. 30, 2021

Related U.S. Application Data

(63) Continuation of application No. 16/586,907, filed on Sep. 28, 2019, now Pat. No. 11,055,387, which is a (Continued)

(51) Int. Cl.
*G06F 21/31* (2013.01)
*B42D 25/23* (2014.01)
(Continued)

(52) U.S. Cl.
CPC .......... *G06F 21/316* (2013.01); *B42D 25/23* (2014.10); *B42D 25/305* (2014.10); *G06F 21/64* (2013.01);
(Continued)

(58) Field of Classification Search
CPC .............. G06F 21/316; G06F 21/64; G06F 2221/2111; B42D 25/23; B42D 25/305;
(Continued)

(56) References Cited

U.S. PATENT DOCUMENTS 5,040,142 A   8/1991   Mori et al.
5,220,675 A   6/1993   Padawer et al.
(Continued)

FOREIGN PATENT DOCUMENTS

CN    1996360 A    7/2007
CN    101299256 A    11/2008
(Continued)

OTHER PUBLICATIONS

"U.S. Appl. No. 13/549,801, Examiner Interview Summary dated Mar. 6, 2014", 3 pgs.
(Continued)

*Primary Examiner* — Darren B Schwartz
(74) *Attorney, Agent, or Firm* — Shumaker & Sieffert, P.A.

(57) ABSTRACT

Techniques for electronic signature process management are described. Some embodiments provide an electronic signature service ("ESS") configured to manage electronic identity cards. In some embodiments, the ESS generates and manages an electronic identity card for a user, based on personal information of the user, activity information related to the user's actions with respect to the ESS, and/or social networking information related to the user. The electronic identity card of a signer may be associated with an electronic document signed via the ESS, so that users may obtain information about the signer of the document. The ESS may also generate a trust score for the user based on activity information related to the user's actions with respect to the ESS and/or other factors. The trust score may be used to
(Continued)

recommend authentication mechanisms to use with respect to electronic signature transactions.

18 Claims, 13 Drawing Sheets

Related U.S. Application Data continuation of application No. 15/792,027, filed on Oct. 24, 2017, now Pat. No. 10,430,570, which is a continuation of application No. 14/611,073, filed on Jan. 30, 2015, now Pat. No. 9,824,198, which is a continuation-in-part of application No. 14/537,803, filed on Nov. 10, 2014, now Pat. No. 9,628,462, which is a continuation of application No. 13/549,801, filed on Jul. 16, 2012, now Pat. No. 8,910,258.

(60) Provisional application No. 61/507,892, filed on Jul. 14, 2011.

(51) Int. Cl.
  *B42D 25/305* (2014.01)
  *G06F 21/64* (2013.01)
  *G06Q 20/38* (2012.01)
  *H04L 9/40* (2022.01)
  *G06F 16/21* (2019.01)

(52) U.S. Cl.
  CPC ....... *G06Q 20/3825* (2013.01); *H04L 63/126* (2013.01); *H04L 63/1425* (2013.01); *G06F 16/219* (2019.01); *G06F 2221/2111* (2013.01); *H04L 63/08* (2013.01); *H04L 63/0823* (2013.01)

(58) Field of Classification Search
  CPC .............. G06Q 20/3825; G06Q 20/384; H04L 63/126; H04L 63/1425; H04L 63/08; H04L 63/0823
  See application file for complete search history.

(56) References Cited

U.S. PATENT DOCUMENTS

| | | | |
|---|---|---|---|
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |
| 5,553,145 A | 9/1996 | Micali |
| 5,615,268 A | 3/1997 | Bisbee et al. |
| 5,629,982 A | 5/1997 | Micali |
| 5,689,567 A | 11/1997 | Miyauchi |
| 5,748,738 A | 5/1998 | Bisbee et al. |
| 5,813,009 A | 9/1998 | Johnson et al. |
| 5,832,499 A | 11/1998 | Gustman |
| 5,872,848 A | 2/1999 | Romney et al. |
| 5,898,156 A | 4/1999 | Wilfong |
| 6,021,202 A | 2/2000 | Anderson et al. |
| 6,067,531 A | 5/2000 | Hoyt et al. |
| 6,085,322 A | 7/2000 | Romney et al. |
| 6,092,080 A | 7/2000 | Gustman |
| 6,119,229 A | 9/2000 | Martinez et al. |
| 6,128,740 A | 10/2000 | Curry et al. |
| 6,161,139 A | 12/2000 | Win et al. |
| 6,185,587 B1 | 2/2001 | Bernardo et al. |
| 6,185,683 B1 | 2/2001 | Ginter et al. |
| 6,199,052 B1 | 3/2001 | Milly et al. |
| 6,210,276 B1 | 4/2001 | Mullins |
| 6,237,096 B1 | 5/2001 | Bisbee et al. |
| 6,289,460 B1 | 7/2001 | Hajmiragha |
| 6,321,333 B1 | 11/2001 | Murray |
| 6,327,656 B2 | 12/2001 | Zabelian |
| 6,367,010 B1 | 4/2002 | Venkatram et al. |
| 6,367,013 B1 | 4/2002 | Bisbee et al. |
| 6,446,115 B2 | 9/2002 | Powers |
| 6,470,448 B1 | 10/2002 | Kuroda et al. |
| 6,584,466 B1 | 6/2003 | Is et al. |
| 6,615,348 B1 | 9/2003 | Gibbs |
| 6,658,403 B1 | 12/2003 | Kuroda et al. |
| 6,671,805 B1 | 12/2003 | Brown et al. |
| 6,728,762 B1 | 4/2004 | Estrada et al. |
| 6,751,632 B1 | 6/2004 | Petrogiannis |
| 6,754,829 B1 | 6/2004 | Butt et al. |
| 6,796,489 B2 | 9/2004 | Slater et al. |
| 6,807,633 B1 | 10/2004 | Pavlik |
| 6,829,635 B1 | 12/2004 | Townshend |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,959,382 B1 | 10/2005 | Kinnis et al. |
| 6,961,854 B2 | 11/2005 | Serret-Avila et al. |
| 6,973,569 B1 | 12/2005 | Anderson et al. |
| 6,990,684 B2 | 1/2006 | Futamura et al. |
| 7,039,805 B1 | 5/2006 | Messing |
| 7,059,516 B2 | 6/2006 | Matsuyama et al. |
| 7,069,443 B2 | 6/2006 | Berringer et al. |
| 7,093,130 B1 | 8/2006 | Kobayashi |
| 7,100,045 B2 | 8/2006 | Yamada et al. |
| 7,103,778 B2 | 9/2006 | Kon et al. |
| 7,134,024 B1 | 11/2006 | Binding et al. |
| 7,162,635 B2 | 1/2007 | Bisbee et al. |
| 7,167,844 B1 | 1/2007 | Leong et al. |
| 7,197,644 B2 | 3/2007 | Brewington |
| 7,237,114 B1 | 6/2007 | Rosenberg |
| 7,340,608 B2 | 3/2008 | Laurie et al. |
| 7,360,079 B2 | 4/2008 | Wall |
| 7,395,436 B1 | 7/2008 | Nemovicher |
| 7,424,543 B2 | 9/2008 | Rice, III |
| 7,437,421 B2 | 10/2008 | Bhogal et al. |
| 7,523,315 B2 | 4/2009 | Hougaard |
| 7,533,268 B1 | 5/2009 | Catoricini et al. |
| 7,554,576 B2 | 6/2009 | Erol et al. |
| 7,562,053 B2 | 7/2009 | Twining et al. |
| 7,568,101 B1 | 7/2009 | Catoricini et al. |
| 7,568,104 B2 | 7/2009 | Berryman et al. |
| 7,581,105 B2 | 8/2009 | Dietl |
| 7,657,832 B1 | 2/2010 | Lin |
| 7,660,863 B2 | 2/2010 | Boursetty et al. |
| 7,788,259 B2 | 8/2010 | Patterson et al. |
| 7,934,098 B1 | 4/2011 | Hahn et al. |
| 7,953,977 B2 | 5/2011 | Maruyama et al. |
| 8,103,867 B2 | 1/2012 | Spitz |
| 8,132,013 B2 | 3/2012 | Meier |
| 8,286,071 B1 | 10/2012 | Zimmerman et al. |
| 8,327,131 B1 | 12/2012 | Hardjono et al. |
| 8,499,150 B1 | 7/2013 | Nachenberg |
| 8,588,483 B2 | 11/2013 | Hicks et al. |
| 8,601,270 B2 | 12/2013 | Dupre |
| 8,612,349 B1 | 12/2013 | Ledder et al. |
| 8,631,486 B1 * | 1/2014 | Friedman ................ G06F 21/31 726/19 |
| 8,650,649 B1 | 2/2014 | Chen et al. |
| 8,910,258 B2 | 12/2014 | Gonser et al. |
| 8,949,708 B2 | 2/2015 | Peterson et al. |
| 9,094,469 B1 | 7/2015 | Wilder et al. |
| 9,251,131 B2 | 2/2016 | McCabe et al. |
| 9,270,467 B1 | 2/2016 | Chen et al. |
| 9,438,619 B1 | 9/2016 | Chan et al. |
| 9,628,462 B2 | 4/2017 | Gonser et al. |
| 9,628,492 B2 | 4/2017 | Buehler et al. |
| 9,824,198 B2 | 11/2017 | Carroll et al. |
| 10,430,570 B2 | 10/2019 | Gonser et al. |
| 11,055,387 B2 | 7/2021 | Gonser et al. |
| 11,263,299 B2 | 3/2022 | Gonser et al. |
| 11,341,220 B2 | 5/2022 | Gonser et al. |
| 2001/0018739 A1 | 8/2001 | Anderson et al. |
| 2001/0034739 A1 | 10/2001 | Anecki et al. |
| 2001/0034835 A1 | 10/2001 | Smith |
| 2002/0004800 A1 | 1/2002 | Kikuta et al. |

(56) References Cited

U.S. PATENT DOCUMENTS

| | | |
|---|---|---|
| 2002/0016910 A1 | 2/2002 | Wright et al. |
| 2002/0019937 A1 | 2/2002 | Edstrom et al. |
| 2002/0026427 A1 | 2/2002 | Kon et al. |
| 2002/0026582 A1 | 2/2002 | Futamura et al. |
| 2002/0040431 A1 | 4/2002 | Kala et al. |
| 2002/0042879 A1 | 4/2002 | Gould et al. |
| 2002/0062441 A1 | 5/2002 | Ooishi |
| 2002/0069179 A1 | 6/2002 | Slater et al. |
| 2002/0069358 A1 | 6/2002 | Silvester |
| 2002/0129056 A1 | 9/2002 | Conant et al. |
| 2002/0138445 A1 | 9/2002 | Laage et al. |
| 2002/0143711 A1 | 10/2002 | Nassiri |
| 2002/0144149 A1 | 10/2002 | Hanna et al. |
| 2002/0162000 A1 | 10/2002 | Bensler |
| 2002/0178187 A1 | 10/2002 | Rasmussen et al. |
| 2002/0184485 A1 | 12/2002 | Dray et al. |
| 2002/0194219 A1 | 12/2002 | Bradley et al. |
| 2002/0196478 A1 | 12/2002 | Struble |
| 2003/0023878 A1 | 1/2003 | Rosenberg et al. |
| 2003/0048301 A1 | 3/2003 | Menninger |
| 2003/0051016 A1 | 3/2003 | Miyoshi et al. |
| 2003/0070091 A1* | 4/2003 | Loveland ............ H04W 12/082 709/229 |
| 2003/0078880 A1 | 4/2003 | Alley et al. |
| 2003/0120553 A1 | 6/2003 | Williams |
| 2003/0120930 A1 | 6/2003 | Simpson et al. |
| 2003/0131073 A1 | 7/2003 | Lucovsky et al. |
| 2003/0140252 A1 | 7/2003 | Lafon et al. |
| 2003/0217275 A1 | 11/2003 | Bentley et al. |
| 2004/0054606 A1 | 3/2004 | Broerman |
| 2004/0078337 A1 | 4/2004 | King et al. |
| 2004/0107352 A1 | 6/2004 | Yui et al. |
| 2004/0117627 A1 | 6/2004 | Brewington |
| 2004/0133493 A1 | 7/2004 | Ford et al. |
| 2004/0181756 A1 | 9/2004 | Berringer et al. |
| 2004/0225884 A1 | 11/2004 | Lorenzini et al. |
| 2004/0230891 A1 | 11/2004 | Pravetz et al. |
| 2004/0250070 A1 | 12/2004 | Wong |
| 2004/0250099 A1 | 12/2004 | Pravetz et al. |
| 2004/0255114 A1 | 12/2004 | Lee et al. |
| 2004/0255127 A1 | 12/2004 | Arnouse |
| 2005/0033811 A1 | 2/2005 | Bhogal et al. |
| 2005/0049903 A1 | 3/2005 | Raja |
| 2005/0066172 A1 | 3/2005 | Vorbruggen et al. |
| 2005/0076215 A1 | 4/2005 | Dryer |
| 2005/0091143 A1 | 4/2005 | Schmidt et al. |
| 2005/0120217 A1 | 6/2005 | Fifield et al. |
| 2005/0125674 A1* | 6/2005 | Nishiki ................ G07C 9/28 713/182 |
| 2005/0138382 A1 | 6/2005 | Hougaard et al. |
| 2005/0138430 A1 | 6/2005 | Landsman |
| 2005/0165626 A1 | 7/2005 | Karpf |
| 2005/0172229 A1 | 8/2005 | Reno et al. |
| 2005/0182684 A1 | 8/2005 | Dawson et al. |
| 2005/0182956 A1 | 8/2005 | Ginter et al. |
| 2005/0192908 A1 | 9/2005 | Jorimann et al. |
| 2005/0226473 A1 | 10/2005 | Ramesh |
| 2005/0231738 A1 | 10/2005 | Huff et al. |
| 2005/0289081 A1 | 12/2005 | Sporny |
| 2006/0015722 A1 | 1/2006 | Rowan et al. |
| 2006/0047600 A1 | 3/2006 | Bodenheim et al. |
| 2006/0047605 A1 | 3/2006 | Ahmad |
| 2006/0047725 A1 | 3/2006 | Bramson |
| 2006/0095971 A1 | 5/2006 | Costea et al. |
| 2006/0124726 A1 | 6/2006 | Kotovich et al. |
| 2006/0161435 A1 | 7/2006 | Atef et al. |
| 2006/0161780 A1 | 7/2006 | Berryman et al. |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0212931 A1 | 9/2006 | Shull et al. |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0022162 A1 | 1/2007 | Thayer et al. |
| 2007/0026927 A1 | 2/2007 | Yaldoo et al. |
| 2007/0061586 A1 | 3/2007 | Golubchik et al. |
| 2007/0079139 A1 | 4/2007 | Kim |
| 2007/0086592 A1 | 4/2007 | Ellison et al. |
| 2007/0088958 A1 | 4/2007 | Qa'lm-maqami |
| 2007/0118732 A1 | 5/2007 | Whitmore |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0143629 A1 | 6/2007 | Hardjono et al. |
| 2007/0165865 A1 | 7/2007 | Talvitie |
| 2007/0180078 A1 | 8/2007 | Murphy et al. |
| 2007/0198533 A1 | 8/2007 | Foygel et al. |
| 2007/0208944 A1 | 9/2007 | Pavlicic |
| 2007/0220260 A1 | 9/2007 | King |
| 2007/0260738 A1 | 11/2007 | Palekar et al. |
| 2007/0271592 A1 | 11/2007 | Noda et al. |
| 2007/0289022 A1 | 12/2007 | Wittkotter |
| 2008/0016357 A1 | 1/2008 | Suarez |
| 2008/0034213 A1 | 2/2008 | Boemker et al. |
| 2008/0097777 A1 | 4/2008 | Rielo |
| 2008/0141033 A1 | 6/2008 | Ginter et al. |
| 2008/0208714 A1 | 8/2008 | Sundaresan |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |
| 2008/0260287 A1 | 10/2008 | Berryman et al. |
| 2008/0313723 A1 | 12/2008 | Naono et al. |
| 2009/0007102 A1 | 1/2009 | Dadhia et al. |
| 2009/0024912 A1 | 1/2009 | McCabe et al. |
| 2009/0025087 A1 | 1/2009 | Peirson, Jr. et al. |
| 2009/0044019 A1 | 2/2009 | Lee et al. |
| 2009/0099881 A1 | 4/2009 | Hanna et al. |
| 2009/0106557 A1 | 4/2009 | Leonard |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0268903 A1 | 10/2009 | Bojinov et al. |
| 2009/0292786 A1 | 11/2009 | McCabe et al. |
| 2009/0300720 A1 | 12/2009 | Guo et al. |
| 2010/0005099 A1 | 1/2010 | Goodman et al. |
| 2010/0017853 A1 | 1/2010 | Readshaw |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0169265 A1 | 7/2010 | Ristock et al. |
| 2010/0217987 A1 | 8/2010 | Shevade |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0067101 A1 | 3/2011 | Seshadri et al. |
| 2011/0093769 A1 | 4/2011 | Dunn et al. |
| 2011/0119165 A1 | 5/2011 | Zee |
| 2011/0126022 A1 | 5/2011 | Sieberer |
| 2011/0179477 A1 | 7/2011 | Starnes et al. |
| 2011/0191200 A1* | 8/2011 | Bayer ................ G06Q 20/12 705/26.1 |
| 2011/0231443 A1 | 9/2011 | Hannel et al. |
| 2011/0238510 A1 | 9/2011 | Rowen et al. |
| 2011/0264907 A1 | 10/2011 | Betz et al. |
| 2011/0296199 A1 | 12/2011 | Kinghorn et al. |
| 2011/0314371 A1 | 12/2011 | Peterson et al. |
| 2012/0072837 A1 | 3/2012 | Triola |
| 2012/0180135 A1 | 7/2012 | Hodges et al. |
| 2012/0198238 A1 | 8/2012 | Rouchouze |
| 2012/0209970 A1 | 8/2012 | Scipioni et al. |
| 2012/0210406 A1 | 8/2012 | Camenisch et al. |
| 2012/0226701 A1 | 9/2012 | Singh |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 6/2013 | Hamid |
| 2013/0227700 A1 | 8/2013 | Dhillon et al. |

(56) References Cited

U.S. PATENT DOCUMENTS

| | | |
|---|---|---|
| 2013/0254111 A1 | 9/2013 | Gonser et al. |
| 2013/0263283 A1 | 10/2013 | Peterson et al. |
| 2014/0019761 A1 | 1/2014 | Shapiro |
| 2014/0164776 A1 | 6/2014 | Hook et al. |
| 2014/0214689 A1 | 7/2014 | Owen |
| 2014/0283031 A1 | 9/2014 | Eksten et al. |
| 2014/0297530 A1 | 10/2014 | Eckel et al. |
| 2015/0007297 A1 | 1/2015 | Grossemy |
| 2015/0026785 A1 | 1/2015 | Soon-Shiong |
| 2015/0047003 A1 | 2/2015 | Khan |
| 2015/0086088 A1 | 3/2015 | King |
| 2015/0095987 A1 | 4/2015 | Potash et al. |
| 2015/0095999 A1 | 4/2015 | Toth |
| 2016/0148039 A1 | 5/2016 | Potash et al. |
| 2017/0300679 A1 | 10/2017 | Jach et al. |
| 2018/0060874 A1 | 3/2018 | Kelts et al. |

FOREIGN PATENT DOCUMENTS

| | | |
|---|---|---|
| CN | 103917999 A | 7/2014 |
| DE | 3935417 A1 | 10/1989 |
| DE | 4117594 A1 | 5/1991 |
| EP | 1238321 A1 | 9/2002 |
| EP | 3507733 A1 | 7/2019 |
| JP | 2000048072 | 2/2000 |
| JP | 2002023629 A | 1/2002 |
| JP | 2003032615 A | 1/2003 |
| JP | 2003509784 | 3/2003 |
| JP | 2003242455 A | 8/2003 |
| JP | 2003271529 A | 9/2003 |
| JP | 2003318885 A | 11/2003 |
| JP | 2004248045 A | 9/2004 |
| JP | 2005267438 A | 9/2005 |
| JP | 2008117258 | 5/2008 |
| JP | 2008518335 A | 5/2008 |
| JP | 2008225527 | 9/2008 |
| JP | 2009105518 A | 5/2009 |
| JP | 2009212570 A | 9/2009 |
| JP | 2012509526 A | 4/2012 |
| KR | 20000049674 A | 8/2000 |
| KR | 1020020092595 | 12/2002 |
| KR | 1020070059931 | 6/2007 |
| KR | 100929488 | 12/2009 |
| KR | 20090122657 A | 12/2009 |
| RU | 2400811 | 11/2005 |
| RU | 2291491 | 10/2007 |
| RU | 2300844 C2 | 6/2010 |
| SU | 844187 A1 | 7/1981 |
| WO | 9220603 A1 | 11/1992 |
| WO | 9407058 A1 | 3/1994 |
| WO | 1996007156 | 3/1996 |
| WO | 2003091834 A2 | 11/2003 |
| WO | 2007075235 | 7/2007 |
| WO | 2008124627 A1 | 10/2008 |
| WO | 2009012478 | 1/2009 |
| WO | 2010034507 A1 | 4/2010 |
| WO | 2010105262 | 9/2010 |
| WO | 2011156819 A2 | 12/2011 |
| WO | 2013010172 | 1/2013 |
| WO | 2016076904 | 5/2016 |

OTHER PUBLICATIONS

"U.S. Appl. No. 13/549,801, Examiner Interview Summary dated Jul. 30, 2014", 1 pg.
"U.S. Appl. No. 14/537,004, Response filed Oct. 28, 2016 to Non Final Office Action dated Jul. 28, 2016", 9 pgs.
"Australian Application Serial No. 2012283810, Non Final Office Action dated Aug. 3, 2016", 3 pgs.
"Australian Application Serial No. 2012283810, Response filed Dec. 1, 2016 to Non Final Office Action dated Aug. 3, 2016", 19 pgs.
"Australian Application Serial No. 2012283810, Response to Subsequent Examiners Report dated Jun. 19, 2017", 26 pgs.
"Australian Application Serial No. 2012283810, Subsequent Examiners Report dated Jul. 17, 2017", 5 pgs.
"Australian Application Serial No. 2012283810, Subsequent Examiners Report dated Dec. 23, 2016", 5 pgs.
"Canadian Application Serial No. 2,841,812, Office Action dated Apr. 13, 2018", 4 pgs.
"Canadian Application Serial No. 2,841,812, Response filed Oct. 11, 2018 to Office Action dated Apr. 13, 2018", 28 pgs.
"Chinese Application Serial No. 201280044857.2, Office Action dated Sep. 12, 2016", W/ English Translation, 24 pgs.
"Chinese Application Serial No. 201280044857.2, Office Action dated Jan. 20, 2017", (English Translation), 20 pgs.
"Chinese Application Serial No. 201280044857.2, Office Action dated Apr. 25, 2016", W/ English Translation, 30 pgs.
"Chinese Application Serial No. 201280044857.2, Response filed Aug. 24, 2016 to Office Action dated Apr. 25, 2016", W/ English Claims, 12 pgs.
"Chinese Application Serial No. 201280044857.2, Response filed Nov. 24, 2016 to Office Action dated Sep. 12, 2016", W/ English Claims, 12 pgs.
"Chinese Application Serial No. 201280044857.2, Response to Office Action dated Mar. 17, 2017", W/ English claims, 14 pgs.
"eLynx Adds Workflow Management to Electronic Document Platform—new Workflow Capabilities Provide for Enhanced Electronic Loan Processing", [Online]. Retrieved from the Internet: < URL: http://www.elynx.com/news/view/82, (Jan. 2009), 2 pgs.
"European Application Serial No. 12811108.5, Response filed Jan. 27, 2016 to Extended European Search Report dated Jul. 20, 2015", 17 pgs.
"European Application Serial No. 12811108.5, Communication Pursuant to Article 94(3) EPC dated Oct. 6, 2017", 5 pgs.
"European Application Serial No. 12811108.5, Extended European Search Report dated Jul. 20, 2015", 7 pgs.
"European Application Serial No. 12811108.5, Office Action dated Feb. 28, 2014", 3 pgs.
"European Application Serial No. 12811108.5, Response filed Feb. 15, 2018 to Communication Pursuant to Article 94(3) EPC dated Oct. 6, 2017", 11 pgs.
"European Application Serial No. 15858385.6, Communication Pursuant to Article 94(3) EPC dated May 22, 2018", 4 pgs.
"European Application Serial No. 15858385.6, Extended European Search Report dated May 2, 2018", 3 pgs.
"International Application Serial No. PCT/US2012/046934, International Preliminary Report on Patentability dated Jan. 23, 2014", 8 pgs.
"International Application Serial No. PCT/US2012/046934, International Search Report dated Jan. 28, 2013", 3 pgs.
"International Application Serial No. PCT/US2012/046934, Written Opinion dated Jan. 28, 2013", 6 pgs.
"International Application Serial No. PCT/US220121046934, International Preliminary Report on Patentability dated Jan. 23, 2014", 8 pgs.
"International Application Serial No. PCT/US20151013979, International Preliminary Report on Patentability dated May 26, 2017", 5 pgs.
"International Application Serial No. PCT/US20151013979, International Search Report dated May 21, 2015", 2 pgs.
"International Application Serial No. PCT/US20151013979, Written Opinion dated May 21, 2015", 3pgs.
"Japanese Application Serial No. 2014-520408, Office Action dated Aug. 17, 2016", WI English Translation, 9 pgs.
"Japanese Application Serial No. 2014-520408, Response filed Jan. 13, 2017 to Office Action dated Aug. 17, 2016", W/ English Claims, 15 pgs.
"Singapore Application Serial No. 2014002828, Office Action dated Jul. 27, 2015", 12 pgs.
"Singapore Application Serial No. 2014002828, Response filed Nov. 25, 2015 to Office Action dated Jul. 9, 2015", WI English Translation, 5 pgs.
Belleboni, et al., "Digital Identity Applied to Telematic Voting Involving European Citizens Social and Legal Implications", (2010), 268-274 pgs.

(56) References Cited

OTHER PUBLICATIONS

Borozdin et al., "DocuSign Connect Service Guide," DocuSign, Inc., pp. 1-9, 2008.
Brown, "Digital Signatures: Can They Be Accepted As Legal Signatures in EID?", Dec. 1993, ACM, p. 86-92.
Environment, IEEE, (2005), 497-502 Laurens, Leurs, The history of PDF, Prepressure.com, (Feb. 14, 2010), 1-12.
Harold, Elliotie Rusty, XML Bible. 1OG Books Worldwide, Inc., 1999, p. 191-192.
Herzberg et al., "Surf'N'Sign: Client Signatures on Web Documents", 1998, IEEE, vol. 37 Issue 1, p. 61-71.
Ilayat, et al., "Identity Management System for Electronic Government Processes in Pakistan", (2008), 271-277 pgs.
Kamara et al., "Cryptographic Cloud Storage", 2010, Financial Cryptography and Data Security, p. 136-149.
Klenk, et al., "Preventing Identity Theft with Electronic Identity Cards and the Trusted Platform Module", (2009), 44-51 pgs.
Kwok et al., "An Automatic Electronic Contract Document Signing System in a Secure Environment", 2005, IEEE, P. 497-502.
Laurens Leurs; The history of PDF; Feb. 14, 2010; Prepressure.com; pp. 1-12.
Mutlugun, et al., "Turkish National Electronic Identity Card", (2009), 14-18 pgs.
Prosecution History from U.S. Appl. No. 13/549,801, now issued U.S. Pat. No. 8,910,258, dated Jun. 19, 2013 through Aug. 19, 2014, 91 pp.
Prosecution History from U.S. Appl. No. 14/537,803, now issued U.S. Pat. No. 9,628,462, dated Apr. 20, 2015, through Dec. 9, 2016, 29 pp.
Prosecution History from U.S. Appl. No. 14/611,073, now issued U.S. Pat. No. 9,824,198, dated Jun. 16, 2017 through Jul. 21, 2017, 18 pp.
Prosecution History from U.S. Appl. No. 15/792,027, now issued U.S. Pat. No. 10,430,570, dated Jan. 10, 2018 through May 6, 2019, 22 pp.
Prosecution History from U.S. Appl. No. 15/930,314, now issued U.S. Pat. No. 11,263,299, dated May 13, 2020 through Dec. 7, 2021, 25 pp.
Prosecution History from U.S. Appl. No. 16/586,907, now issued U.S. Pat. No. 11,055,387, dated Dec. 16, 2019 through Jun. 11, 2021, 26 pp.
Prosecution History from U.S. Appl. No. 16/933,924, now issued U.S. Pat. No. 11,341,220, dated Jul. 21, 2020 through Mar. 2, 2022, 19 pp.
Su et al., "Signature-In-Signature Verification Via a Secure Simple Network Protocol", 2010, IEEE, p. 1-4.
Wheeler et al., "DocuSign Unveils new Scalable Product and Support Offerings of Electronic Signature and Electronic Contract Execution," DocuSign The Fastest Way to Get a Signature, 2 pages, Jan. 2008.
Zefferer et al., "An Electronic-Signature Based Circular Resolution Database System," Mar. 2010, ACM, p. 1840-1845.

* cited by examiner

DocuSign Document ID

Document Specifications

Document Name: Regina P. Brown
Document ID: 23425312341111343
Pages: 5
Sent: 10/15/2009 7:45:00 PM
Signed: 10/15/2009 7:47:30 PM Signer Information Signer Name: Regina P. Brown
Signer Email: reginapbrown@MSN.com
Authentication Level: ID Check Validate Information
Upload a copy to validate
TrialDocument.pdf X Download a copy from DocuSign
☐ Digitally Sign Download
☐ Include certificate of completion 24930B9A8744F43A...
*Regina P. Brown*
DocuSigned By: Regina P. Brown Document is Valid

SYSTEM AND METHOD FOR IDENTITY AND REPUTATION SCORE BASED ON TRANSACTION HISTORY

CROSS REFERENCE TO RELATED APPLICATIONS

This application is a continuation of U.S. application Ser. No. 16/586,907, filed Sep. 28, 2019, now U.S. Pat. No. 11,055,387, which application is a continuation of U.S. application Ser. No. 15/792,027, filed Oct. 24, 2017, now U.S. Pat. No. 10,430,570, which application is a continuation of U.S. application Ser. No. 14/611,073, filed Jan. 30, 2015, now U.S. Pat. No. 9,824,198, which application is a continuation-in-part of U.S. patent application Ser. No. 14/537,803 filed on Nov. 10, 2014, now U.S. Pat. No. 9,628,462, which is a continuation of U.S. patent application Ser. No. 13/549,801, filed on Jul. 16, 2012, now U.S. Pat. No. 8,910,258, which claims the benefit of U.S. Provisional Application No. 61/507,892 filed Jul. 14, 2011, the contents of which are incorporated by reference.

FIELD OF THE INVENTION

The present disclosure relates to methods and systems for electronic signatures and, more particularly, to methods and systems for managing electronic signature identity cards.

BRIEF DESCRIPTION OF THE DRAWINGS

Preferred and alternative examples of the present invention are described in detail below with reference to the following drawings:

FIGS. 2A-2F illustrate example electronic identity cards and related user interface aspects according to example embodiments;

DETAILED DESCRIPTION

Figure 1:
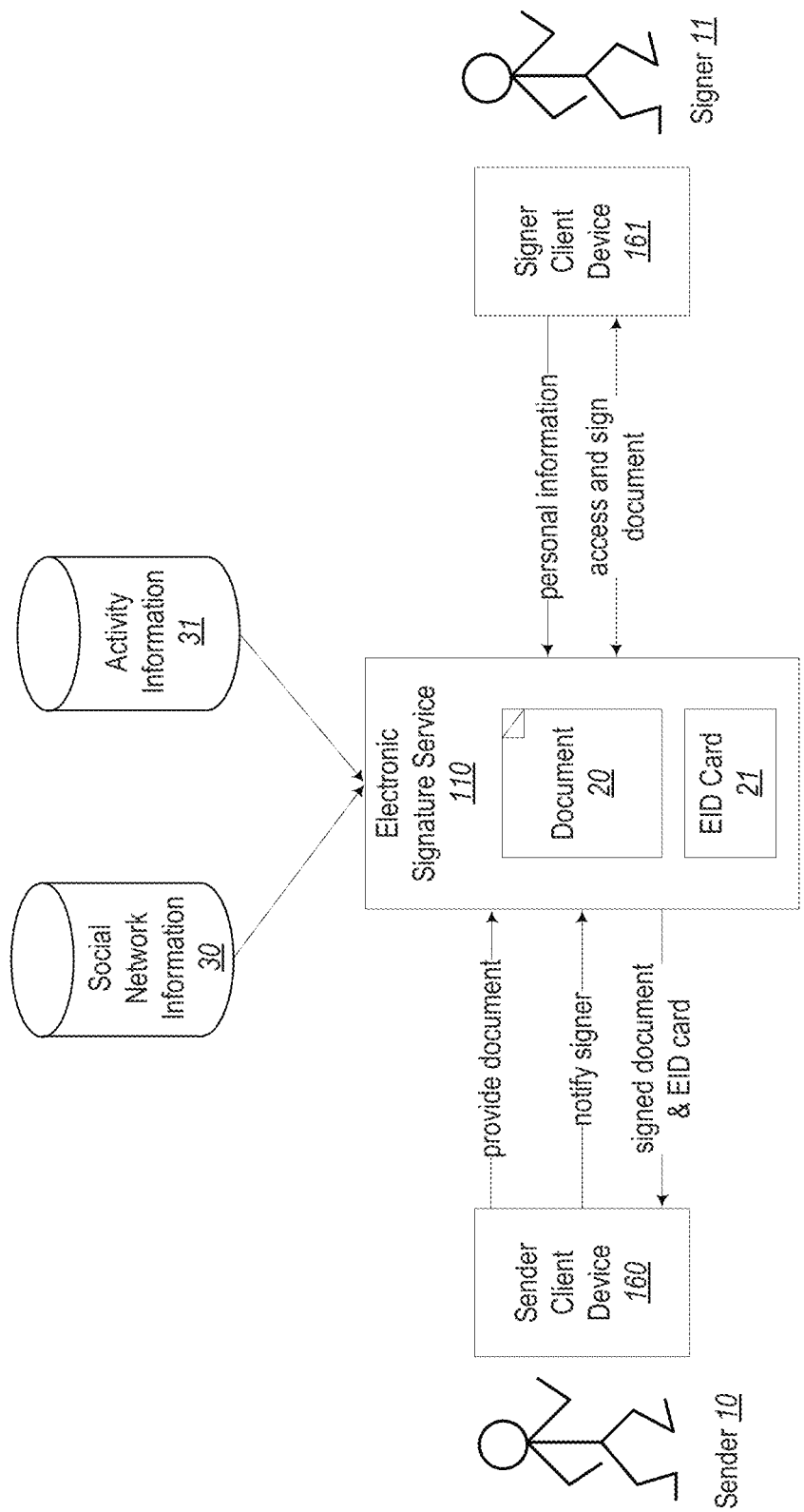
FIG. 1 illustrates an example block diagram of an example embodiment of an electronic signature service that provides an electronic identity card.

Embodiments described herein provide enhanced computer- and network-based methods and systems for electronic identity/identification ("EID") cards. Example embodiments provide an electronic signature service ("ESS") configured to facilitate management of electronic identity cards. In some embodiments, an EID card is associated with a user (or "signer") and includes, aggregates, links, or otherwise combines information about the user obtained from multiple sources and of multiple distinct types to form or represent a "social signature" associated with the user. Example information may include personal information about the user (e.g., name, address, occupation, picture), electronic signature service usage/statistical information (e.g., number and types of documents signed using the ESS, number and types of authentication challenges passed), and/or social networking information (e.g., links to identities on one or mom social networking or messaging services).

The described EID card adds a new depth of personalization to an electronic signature. In some embodiments, the EID card displays a signer's information, how often the signer has signed and sent documents for signature, and authentication history. In further embodiments, geo-location features are provided. For example, the EID card may capture or otherwise represent the exact (or approximate) geo-location of where a signer signed for added security. As another example, users may be provided with the ability to view the location of the last document signed from any signer through a geo-location subsystem of the ESS. Also, "badges" may be associated with an EID card to indicate one or more qualities or characteristics about the associated signer, such as environmental/ecological commitment or achievement (e.g., based on the number of times the signer has signed a document electronically instead of on paper), travel profiles (e.g., the number of different countries from which the signer has signed documents), and the like.

The described techniques provide an EID card that is much more than a signature. More particularly, an EID card provides additional information about a signer and validates or further authenticates the identity of the signer. Using EID cards, senders (e.g., parties who provide documents for signature) and signers can see how often the signer has authenticated, how often they use the ESS, a picture of the signer, the signer's contact information, and the like.

In some embodiments, the ESS determines a "trust graph," which reflects or otherwise identifies a network of trust connecting two or more persons who are in some way related via the ESS or other related systems. For example, a trust graph may be based on relationships such as those that are formed when a first user signs a document provided by a second user. Once that occurs, a trust relationship between the first and second user can be represented and stored by the ESS. Such a relationship may be further strengthened when additional signature events take place between the first and second user. Furthermore, relationships can be specified by a user, such as by identifying other persons that are trusted by the user. Users may specify relationships manually or by importing such information from various electronic sources, including address books, chat logs, social networks, and the like. In addition, the EID card can be used as a vehicle for surfacing or otherwise presenting information about a signer's trust graph. The ESS, via the use of EID cards, can thus provide a wide-ranging network within which trusted transactions can be performed.

FIG. 1 illustrates an example block diagram of an example embodiment of an electronic signature service that provides an electronic identity card. In particular, FIG. 1 depicts an electronic signature service 110 utilized by a sender user 10 and a signer user 11 to generate an electronic signature card and to associate the generated card with an electronic signature document.

The ESS 110 facilitates the creation of electronic signature documents and the association of electronic signatures therewith. For example, the sender 10 may operate a sender client device 160 to provide (e.g., transmit, upload, send) a document 20 to be electronically signed to the ESS 110, where it is securely stored. The document 20 may be or include a contract, agreement, purchase order, or the like. The signer 11 operates a signer client device 161 to access, review, and/or sign the document 20 stored by the ESS 110. In some embodiments, the ESS 110 transmits images or some other representation of the document 20 to the signer client device 161, which in turn transmits an indication of the signer's signature (or intent to sign) to the ESS 110. The ESS 110 then securely stores the signer's signature in association with the document 20.

The ESS 110 also performs electronic identity card-related functions for or on behalf of the users 10 and 11. For example, the signer 11, operating the signer client device 161, may interact with the ESS 110 to create an ETD card 21 that is stored and managed by the ESS 110. To create the ETD card 21, the signer 11 may provide one or more personal information items, including name, address, occupation, telephone number, picture, or the like.

The ESS 110 may augment the EID card 21 with social networking information related to the signer 11. For example, when creating the EID card 21, the signer 11 may provide credentials (e.g., username and password) associated with a social network maintained by some third-party social networking system. Using the provided credentials, the ESS 110 may then obtain social network information 30 about the signer and his social network via an API or other facility provided by the social networking system. The obtained information 30 may be stored as part of (or in association with) the signer's EID card 21.

The ESS 110 may further augment the EID card 21 with activity information 31. The activity information 31 may include information about the activities of the signer 11 with respect to the ESS 110 and/or other systems or services. For example, the ESS 110 may track the number of documents signed by the signer 11, and store that number as part of (or in association with) the EID card 21. The ESS 110 may also include (or otherwise access) a geo-location facility, used to track the location of the signer 11 as he engages in activities with the ESS 110. The geo-location facility may access or otherwise obtain information from the client device 161, such as fine-grained position information provided by a GPS receiver. Coarser-grained information may also or instead by used, such as may be provided by a communication system used by the client device 161 (e.g., carrier system for a mobile phone or other device).

In addition, the ESS 110 may track authentication activities engaged in by the signer 11, such as the number and type of authentication challenges met by the signer 11, in order to generate a score or other measure (e.g., history) reflecting a level or degree of the signer's authentication and/or experience. Information about such activities may then be presented or provided as part of the signer's EID card 21.

Upon creating the EID card 21, a reference to the created EID card 21 may be included as part of a document signed by a signer 11. For example, when the ESS 110 provides (e.g., transmits) a representation of a signed document to the sender 10, it may include information that directly or indirectly (e.g., via a URL) represents the signer's EID card 21. For example, the signed document may include an image that resembles a physical identity card and that includes at least some of the information of the EID card 21. The image or other representation may be active (e.g., clickable), such that additional information may be provided when selected or activated by the sender 10 or other user. In some embodiments, the EID card 21 is assigned or associated with a unique uniform resource locator (URL). The URL may be used by the card holder and/or other users to access, view, and/or modify the details of the EID card 21.

The EID card 21 may be made available in other contexts besides electronic signature documents. For example, the signer 11 may include a URL or other link to the EID card 21 on his social networking profile page, as part of his email signature, or the like.

FIGS. 2A-2E illustrate example electronic identity cards and related user interface aspects according to example embodiments.

Figure 2A:
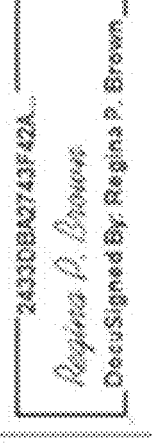

FIG. 2A illustrates an example electronic identity card 200 for a user. The card 200 is a graphical representation of a user's electronic identity card information. The card 200 may be displayed in various contexts, such as in association with a signed electronic document being viewed by the sender 10, as described with respect to FIG. 1, above. The card 200 includes personal information about the signer/card holder, including the card holder's name, age, address, email, phone number, image, identification number, and voice print. Access to some or all of the signer information may be restricted. In this example, the card holder's address is shown in association with a padlock icon, indicating that the card older does not want others to be able to view this information. In some embodiments, a viewer having appropriate credentials (e.g., a password) may access restricted information such as the card holder's address in this example. The voice print is an audio recording created by the card holder when the card was created. A user may access the voice print to hear the voice of the card holder, which may provide additional assurance that the card is legitimate or otherwise actually associated with the indicated person.

The illustrated card 200 also includes signature information. The signature information includes signature authority level, signature date (e.g., the date the signature was applied by the card holder to the associated signature document), signature pages signed (e.g., a total number of pages signed by the card holder), an authentication level, and a signature image (the text "Regina P. Brown" represented in cursive). Clicking on the signature image will cause the ESS to validate the signature and/or card 200, such as by indicating that the card holder does not have (or no longer has) a valid or active account with the service. The authentication level indicates what level and/or type of authentication has been used to verify the identity of the card holder. Authentication levels are discussed in more detail with respect to FIG. 2D, below.

The illustrated signature authority level represents the card holder's authority level with respect to a particular organization. In some embodiments, an administrative user of a company or other organization may select users from a list and set their signature authority. For some users, this signature authority may be none or zero, meaning that they may not sign for any company-related purposes. If so, a reference to an alternative person who does have signatory authority with respect to matters handled by the user may be included. In such cases, when asked to sign a document, the card holder may reassign the document to the alternative person (and no other person) for signature. For some users it may be defined as or based on a monetary value (e.g., up to $10,000) or as a text string describing the type of contract or document. For other users, the signature authority may be total or complete. The signature authority levels may be enforced by the ESS, such as by refusing to allow users with limited signatory authority (e.g., under $1,000) to sign certain documents (e.g., a purchase order in excess of $1,000).

The card 200 further includes social networking information. The card holder has the option of associating one or more social networking services with her card. In this example, the card 200 includes icons (or other user selectable controls, such as buttons) of various associated social networking websites at the bottom of the card 200. The illustrated icons can be used to further validate the card holder's identity. A user who is viewing the card 200 may click on any of these icons to access the card holder's profile on the corresponding social networking website. The card holder may also integrate the card with her social networks, such as by including a link to the card on her profile page of a social network.

FIG. 2B illustrates an example electronic identity card 210 for a document. The card 210 is a graphical representation of a document's identity and signature information. The card 210 may be displayed in various contexts, such as via a link embedded within or associated with a signed electronic document. The card 210 may be used to validate the associated document's authenticity.

The card 210 includes document specifications, including document name, document identifier, number of pages, date sent, and date signed. The card 210 further includes signer information, including signer name, signer email address, authentication level, and signature image. The electronic identity card for the signer may be accessed via a link or other control. For example, upon clicking the signature image, the electronic identity card 200 described with respect to FIG. 2A may be displayed.

The card 210 further includes a validation section. The validation section includes controls that may be used to validate the associated document. For example, using the illustrated controls, a user can upload the original document and check if the document matches. The hash of both the documents will be compared by the ESS, which will then return an indication of whether or not the document is valid. The user may then also have the option to delete the document and/or upload it again (e.g., at a later date) to validate.

The card 210 further includes a download section. Using controls in the download section, a user can download a copy of the document (with or without a certificate of completion) from the ESS.

Figure 2C:
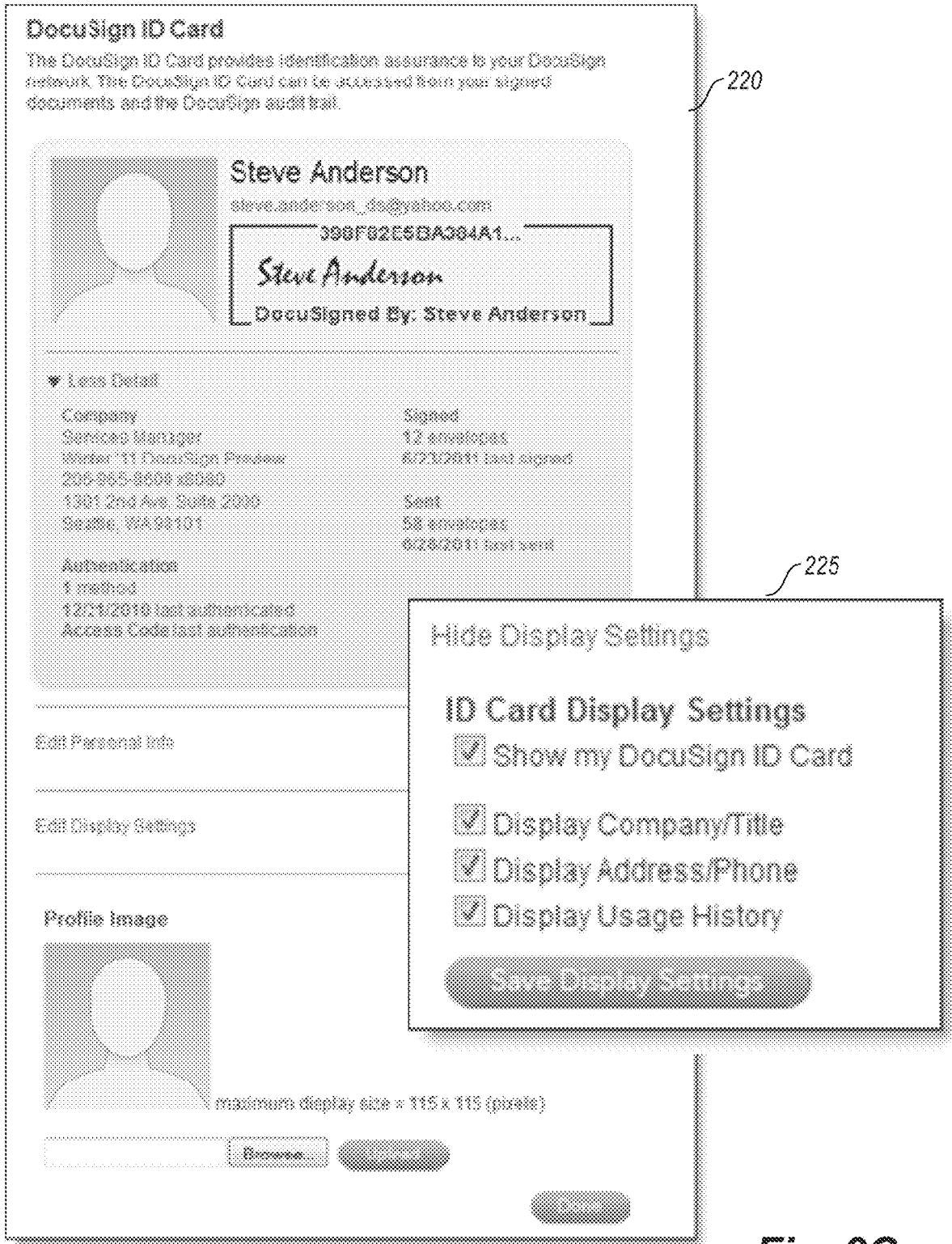

FIG. 2C illustrates an electronic identity card management screen 220. The screen 200 includes controls that can be used by an account holder or other user to manage their electronic identity card, such as that described with respect to FIG. 2A, above. The screen 200 includes and displays card information, including personal information (e.g., name, address, signature, email, image) and activity information (e.g., document signature history, document/envelope sender history).

The user may interact with the screen 220 in order to edit or modify the card information and/or properties. In this example, the user has clicked on the "Edit Display Settings" link, which causes the display settings control 225 to be displayed. The control 225 enables the user to select what portions or elements of his electronic identity card to display, such as the entire card, company/title information, address/phone information, and/or usage history information. In this manner, the user can restrict access to some or all information that is part of his electronic identity card.

Figure 2D:
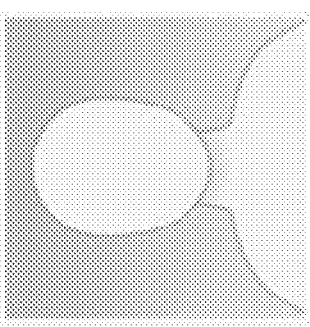
Figure 2D:
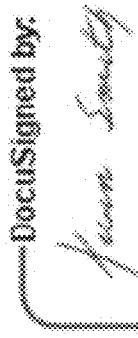

FIG. 2D illustrates an example electronic identity card 230 according to another embodiment. The card 230 is similar to the card 200 describe above. However, the card 230 also displays an authentication history 231. The history 231 displays one or more authentication events and associated dates and mechanisms (e.g., email, phone, password). The authentication history 231 may be expanded to display a history browser/viewer 235 that provides a more comprehensive view of the user's authentication history.

The illustrated card 230 also includes badges 232. In some embodiments, badges may be associated with users (and displayed on their identity cards), in order to indicate properties of the user. In this example, one of the badges 232 (labeled "green profile badge") iconically indicates a level of environmental/ecological commitment or impact associated with the user, based on the number of documents electronically processed or signed via the ESS, thereby reducing the amount of paper, printer, and energy resources used in association with paper-based signatures. Badges may have different shades and/or colors to indicate a level. For example, a darker shade of green used in a green profile badge may indicate a larger number of electronic signature events than a lighter shade.

The badges 232 also include an authentication level badge. The authentication level badge iconically indicates an authentication level associated with the user. Some embodiments have a hierarchy of authentication levels, based on the number and/or type of authentication mechanisms used to verify user identity, including based on one or more of email, short message service (SMS), access code, age, third-party verification, phone, and the like. The corresponding badge may have different colors, such as gold to indicate the highest level, silver to indicate the next highest level, and bronze to indicate the lowest level.

Figure 2E:
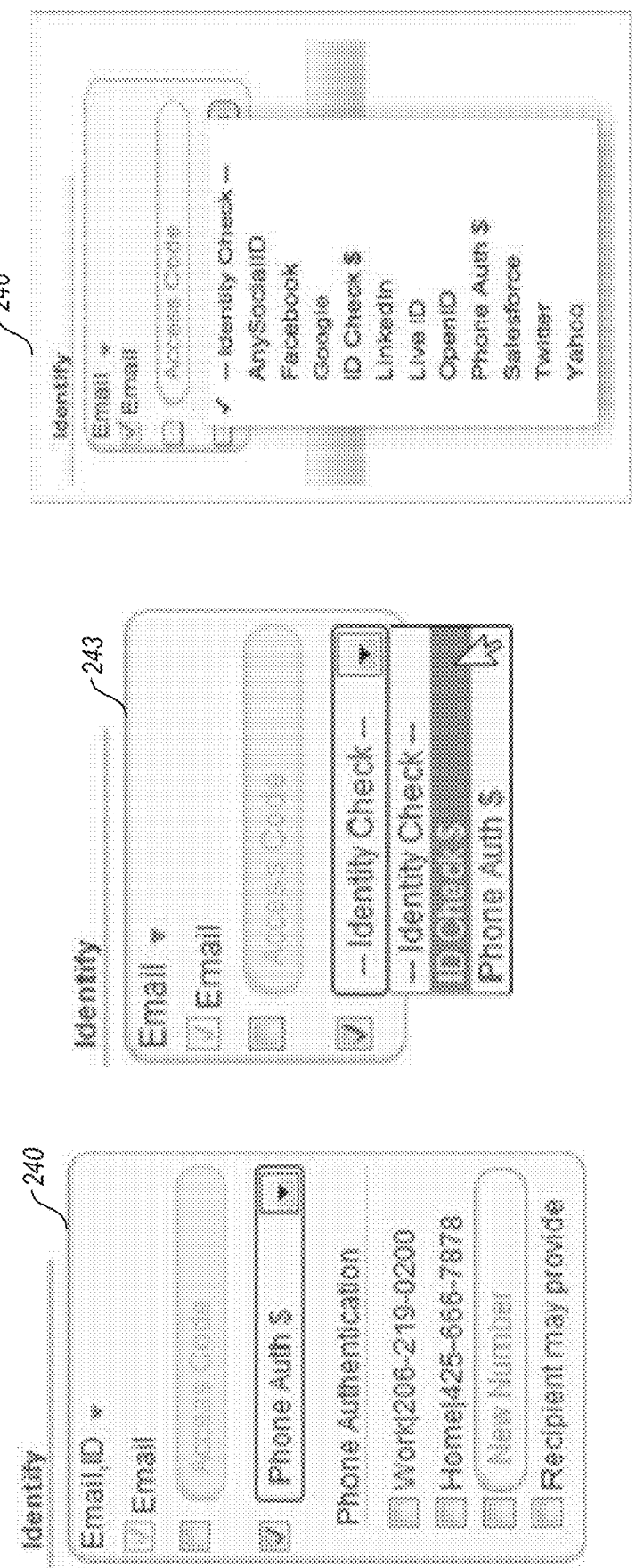

FIG. 2E illustrates authentication mechanisms provided by one embodiment. In particular, FIG. 2E illustrates three distinct selection scenarios 240, 243, and 246 in which one or more authentication mechanisms are selected for association with a document and/or electronic identity card provided by an example embodiment. For example, a sender may select and associate one or more authentication mechanisms with a document that is to be signed by one or more signers. Similarly, one or more of the illustrated authentication mechanisms may be used by a signer to verify their identity when signing a document and/or creating an electronic identity card.

In scenario 240, a user has selected email identification and phone authentication. In some embodiments, email authentication is the default identification/authentication method. Email authentication provides a baseline level of authentication, in that the user operating the identified email account is quite likely the intended recipient or signer of a document.

The phone authentication option asks the user to select or type a phone number to use for authentication. The recipient is provided with a validation code (e.g., in email or other more secure communication). Later, during a signature transaction, the ESS places a call to the number. After answering the phone, the recipient is prompted to enter the validation code and speak their name. The illustrated phone numbers may be automatically obtained from an address book associated with the sender and/or the recipient. Phone authentication may be considered to be a more rigorous authentication method than email authentication.

Also shown, but not selected in this scenario, is access code authentication. In this mechanism, the user types an access code (e.g., upper case or lower case letters, numbers, and special characters) that is also provided to the intended recipient. Later, when the recipient reviews and/or signs a document, he must provide the access code (e.g., via a Web form entry) in order to complete the transaction.

In scenario 243, a user has selected identity check authentication. The identity check option asks the recipient to provide some initial personal information (current address is required, but there may be other optional information the recipient can enter) and then answer a set of questions before the recipient can access a signature document. The questions are based on data available in public records, such as past or present residence addresses of the recipient. In some embodiments, the identity check mechanism may be provided by a third party, such as RSA.

In scenario 246, a user has selected social identity check authentication. The social identity check option asks the recipient to login to a specified (or any) social identity service provider including Facebook, Yahoo, Google, Twitter, OpenID, LiveID, LinkedIn, Salesforce or the like. Once the recipient successfully logs into the specified social identity provider, the recipient will be permitted to view/sign the signature document.

Some embodiments provide a scoring mechanism that may be used to indicate a level of trust or experience associated with a card holder. The score may be based on one more of the following: whether the user is validated/authenticated or not, the level or type of validation/authentication used, the date of the last signature, the date of the last login, the number of pages signed, and the like. The score may be graphically represented on an electronic identity card, by way of color, icons, numerals, letter grades, badges, or the like.

In one embodiment, the score is based on points that are awarded for actions undertaken by a user during signing, sending, authentication, signing authority, connections to other trusted networks, and the like.

Points based on document sending may include points for the first envelope sent by the user, points for subsequent documents (e.g., the next 100), and/or points for reaching milestones (e.g., every $100^{th}$ document). The number of points may vary based on the total number of sending events (e.g., one point per document for documents 1-100, 0.1 point per document for documents 100-500). Points may also be based on the number of total pages sent by the user (e.g., 0.01 points per page). Points may also be based on the number of unique or distinct recipients (e.g., 1 points for each distinct recipient, 5 points for each recipient that has not previously received a document). Points may also be based on frequency or recency of use (e.g., deduct one point for every 30 days that a document is not sent). Other factors may include the number and type of authentication methods used (e.g., one point for sending a document that uses an authentication method other than email address); use of a system API; and/or use of a particular system feature (e.g., bulk sending, mobile device interface).

Points based on document signature may include or be based on: signature adoption; hand drawing a signature rather than using a preselected signature; selecting a different system signature than the default signature; acceptance of the terms and conditions; the number of documents signed; signing milestones (e.g., for the $500^{th}$ document); number of pages signed; frequency or recency of signature (e.g., subtract one point if no signature in the last 90 days); and/or special features used (e.g., document reassignment, carbon copy request, acknowledgement receipt).

Points based on authentication actions or events may include or be based on: initial authentication (e.g., for the first authentication event); use of email authentication; total number of authentications; authentication failures; use of access code authentication; use of identity check authentication; use of phone authentication; use of age verification; use of social network identification; or the like. As different authentication mechanisms are regarded as more secure or rigorous, use of different mechanisms may be rewarded differently to reflect this hierarchy or ordering. For example, phone authentication may be awarded five points, whereas email authentication may be awarded one point, thereby reflecting the actual or perceived security levels associated with each of those mechanisms.

Figure 2F:
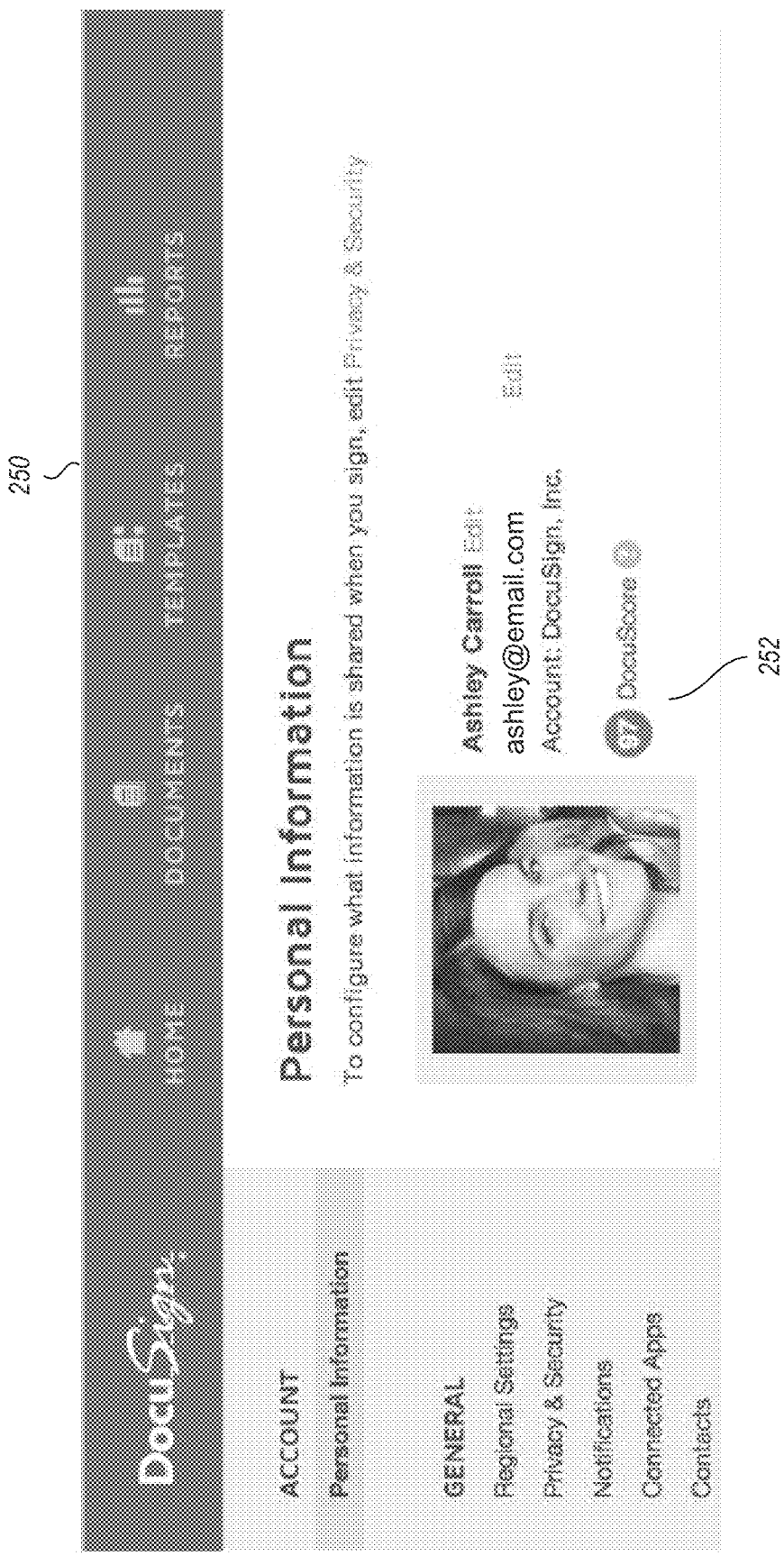

FIG. 2F illustrates an example electronic identity card 250 for a user. The card 250 is a graphical representation of a user's electronic identity. The card 250 includes various information about an electronic signature service user, such as, but not limited to name, email address, account owner, trust score, or the like. In some embodiments, the card 250 may be an electronic identity card, as described herein (e.g., electronic identity card 200).

The card 250 shows the trust score 252 for the user. The trust score, or identity and repudiation score, provides an indication or likelihood that a user is actually the individual or business represented. A trust score can be represented in various ways, such as by number (e.g., on a scale of 0 to 100), by color (e.g., green means high trust, yellow means above average trust, orange means below average trust, red means low trust), by letter grade (e.g., A-F), or the like. Each user can have one or more trust scores. They may have a single trust score, as illustrated. But in other embodiments, they may have a trust score as a sender of documents and a trust score as a signer of documents.

The trust score may be determined by a variety of different mechanisms associated with the user's actions in conjunction with the electronic signature service. For example, the trust score may be determined from points acquired by performing various actions in conjunction with electronic signature transactions, as described above. In various embodiments, the score may be determined from a number of successfully completed transactions as a signer or sender, a number of successfully completed transactions in any role associated with the transaction, the trust scores of other users associated with successfully completing transactions, a time to sign a document of the transaction (e.g., the passage of time between sending/receipt/review of the document and the eventual signature of the document), a number of sent documents that were declined (e.g., a signer refused to sign), a verified identity via offline documents (e.g., verification of a government issued identification), linked social media accounts (e.g., amount of trust may be based on the authentication verification mechanisms of the social media host), linked cloud storage, payment account of file (e.g., a credit card), another electronic signature service account as part of a reputable organization (e.g., user has a personal account and a professional account that is managed by the organization), or the like, or any combination thereof.

It should be recognized that the amount of trust may be different for different actions. For example, linking a social media account may increase the trust score more than rapidly signing a document. In another example, a high number of completed transactions may result in a trust score that is higher than if the user also has a professional account with an organization that has a lower trust score. Furthermore, it should be recognized that various combinations of actions, various thresholds, and the like may be employed to generate the trust score 252.

In some embodiments, the card 250 may include information or hints for how the user can improve their trust score 252. Such information can be, but not limited to, "provide a valid email address," "link to a third party social network," or the like. In some embodiments, gamification techniques can be used to prompt users to improve their trust score. However, the hints/information for improving a trust score may be limited so that users cannot artificially inflate their trust score. In some embodiments, the electronic signature service may place limits on how quickly or how much a user can increase their trust score, so as to inhibit artificial inflation or other types of abuse of trust scoring.

Figure 3A:
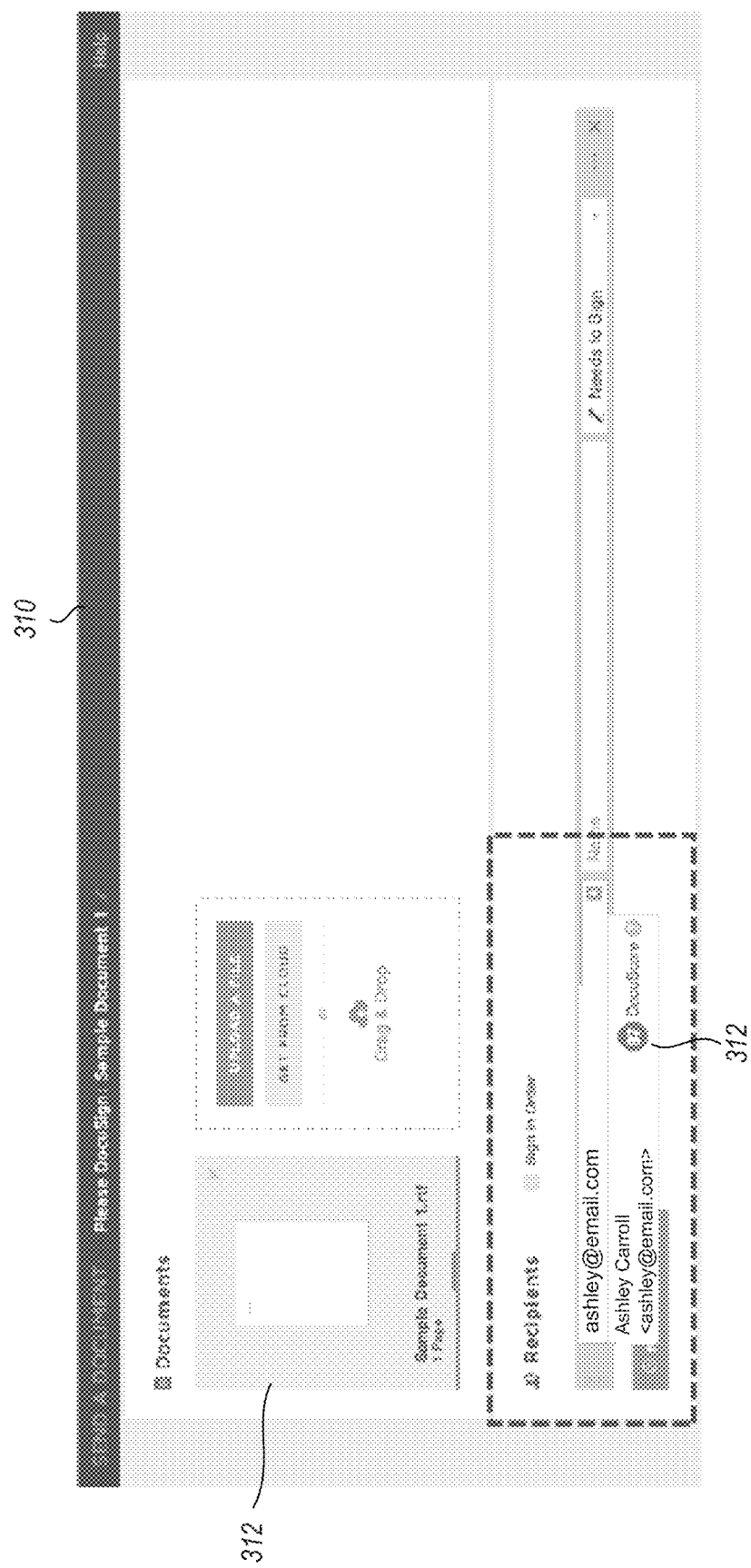
FIGS. 3A-3C illustrate example user interfaces of an electronic signature service with trust scores of users according to example embodiments.

FIG. 3A illustrates an example electronic signature service interface 310. The interface 310 enables a user to initiate an electronic signature transaction via the electronic signature service. The interface 310 provides a mechanisms for a user (i.e., a sender) to attach one or more documents 312 for one or more other users (i.e., signers) to electronically sign.

The interface 310 enables the user to provide the email addresses of one or more other users to be recipients (or signers) of the documents. As the user enters the email address, the service recognizes and auto-completes the email address based on previously used email addresses and/or other sources (e.g., the user's address book, an address book associated with the user's organization). A dropdown window opens showing candidate email addresses. Each candidate email address also includes trust score 314 for that particular user. It should be recognized that other forms of identification may also be entered, such as names or aliases, phone numbers, social security numbers, and the like.

Figure 3B:
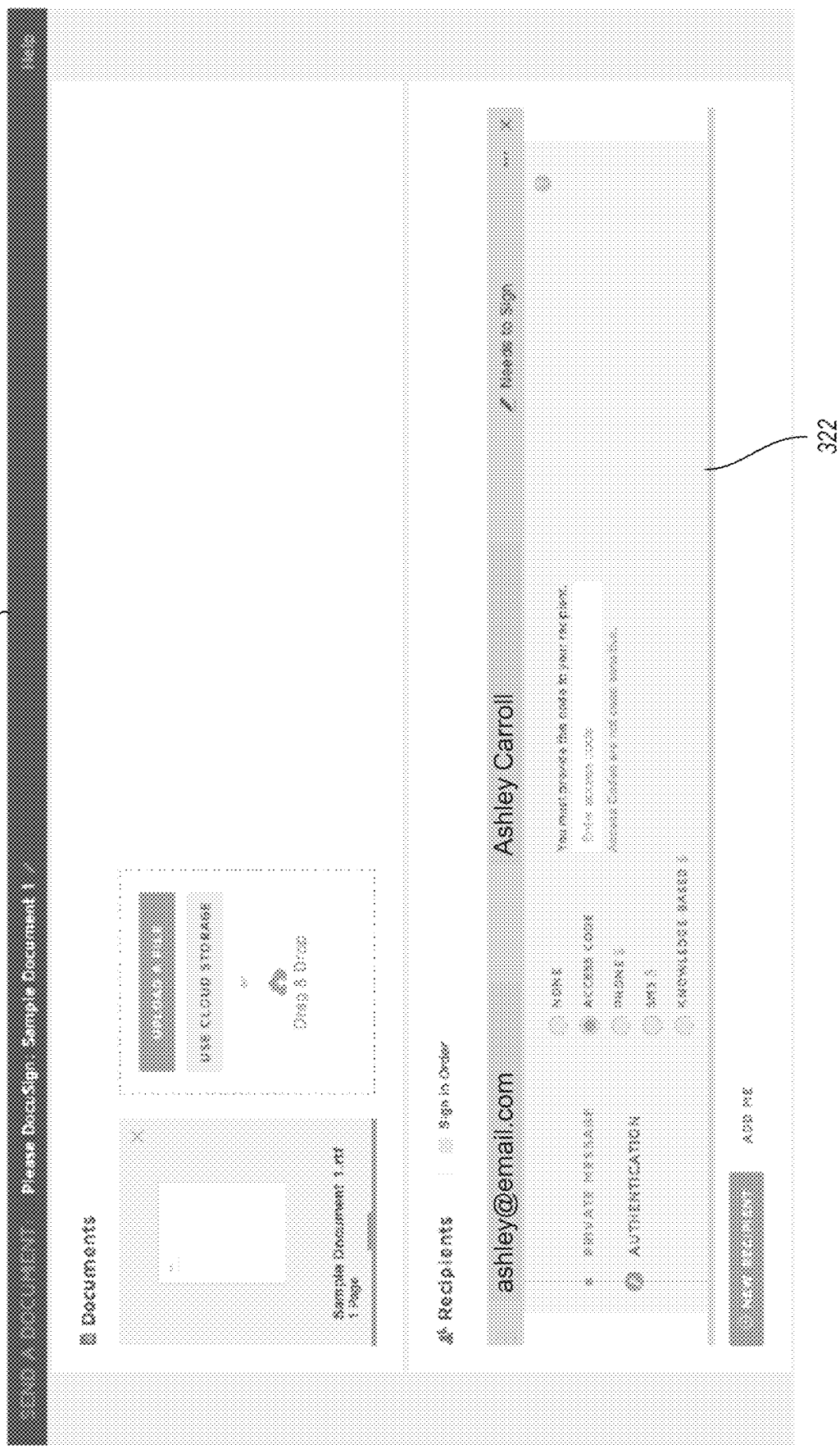

FIG. 3B illustrates an example electronic signature service interface 320. The interface 320 is an embodiment of interface 310, but showing an authentication mechanisms control 322 for the selected user (i.e., the recipient or signer). The authentication mechanisms control 322 includes a list of different authentication mechanisms that the selected user must perform before the document is electronically signed or for the electronically signed document to be validly signed by an authentic user. The illustrated mechanisms include none (e.g., no additional verification required), access-code verification (e.g., signer must provide an access code provided by the sender, the electronic signature service, or other source), short message verification (e.g., signer must provide access code sent by the electronic signature service via SMS to the signer's phone), knowledge-based authentication (e.g., mother's maiden name). These authentication mechanisms provide additional degrees of protection to verify the identity of a user. Such identity verification could include references from verified parties of the electronic signature service who have previously completed transactions with the electronic signature service. Similarly, other identity verification can be conducted, such as, for example, matching the user's name to the name on a credit card on file, allowing users to take a photo or scan government provided identification, asking knowledge-based questions (e.g., mother's maiden name, name of school attended), linking to social network accounts, providing access codes or passwords, or the like.

The authentication mechanisms control 322 automatically recommends an authentication mechanism to the sender based on the trust score of the selected user (e.g., trust score 312 of the signer). The sender can adjust the authentication mechanism accordingly. In some embodiments, the control 322 may disable adjustment of the authentication mechanism, such as if the trust score (of the signer and/or the sender) is below a predetermined threshold, thereby enforcing use of a particular authentication mechanism in the presence of user's having low trust scores. The trust score of the signer helps to reduce the likelihood that an individual signs a document for someone other than her/himself.

In some embodiments, the electronic signature service can provide transaction insurance to the sender based on the trust score of the signer(s). Various levels of trust scores may provide various amounts of transaction insurance. Alternatively, or in addition, a trust score may be used to establish a price for a given amount of transaction insurance, such that insurance for a lower-trust user will be priced higher than insurance for a higher-trust user. This insurance provides a guarantee that the signer is the actual user represented, rather than an imposter.

Figure 3C:
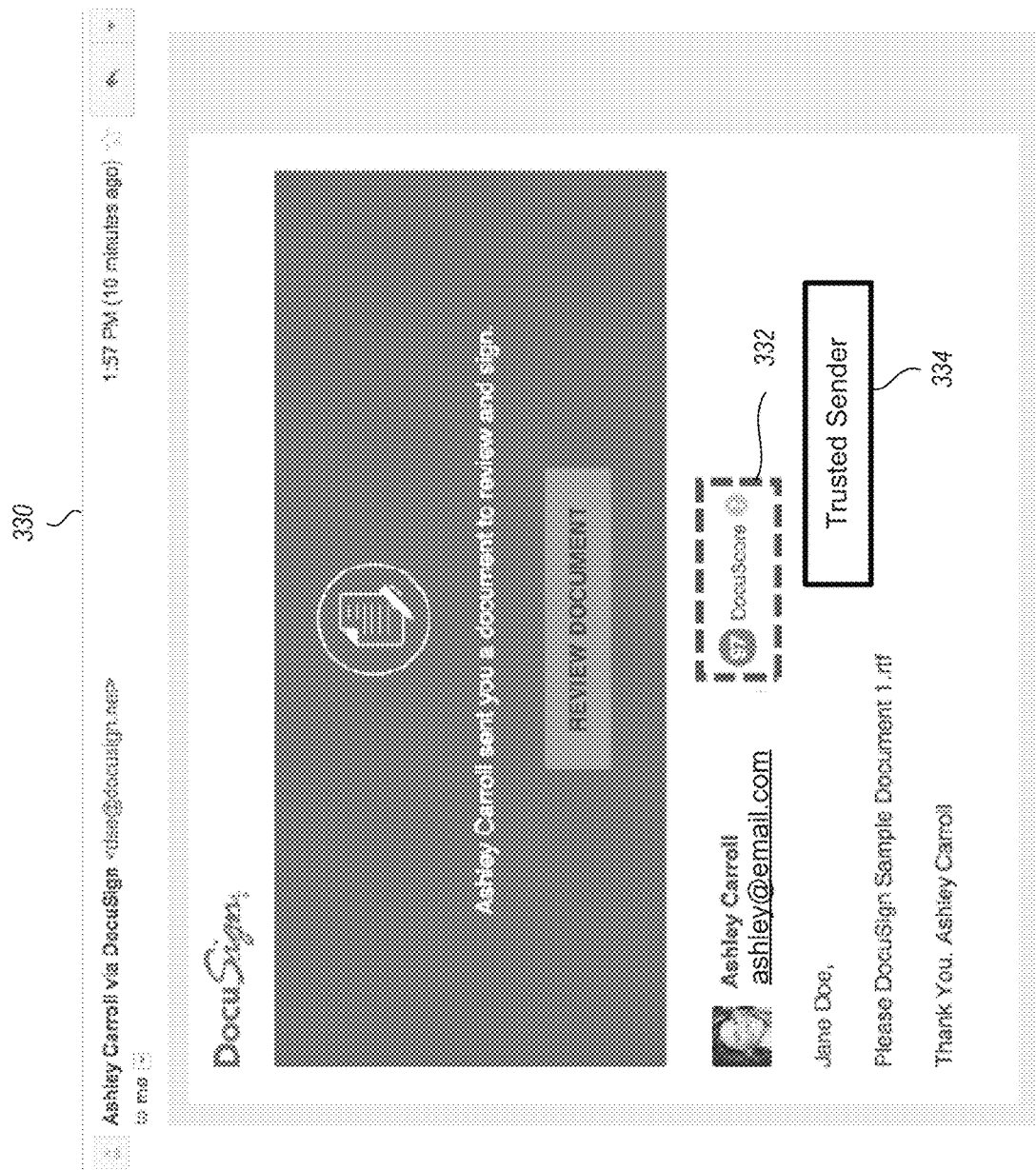

FIG. 3C illustrates an example electronic signature service interface 330. The interface 330 shows a signing user that a sender user has sent them a document associated with an electronic signature transaction to sign. The interface 300 enables the signing user to access and sign the document.

The interface 330 shows the trust score 332 of the sender. In this way, the signing user can determine if the document was sent by a reputable individual or business. The trust score helps to reduce the likelihood that an individual provides personally identifiable information to an unknown party (i.e., the sender) representing themselves inaccurately. For example, if a sender's trust score is low, then a signer can contact the sender to determine if the transaction is legitimate.

In some embodiments, the interface 330 also includes instructions 334 to the signing user regarding the use of personal information. The interface 330 may warn the signing user about providing personal information based on the sending user's trust score.

For example, if the sender's trust score is above a first threshold, then the interface 330 may identify the sender as a trusted electronic signature transaction sender, which is illustrated by instructions 334. But if the sender's trust score is below the first threshold and above a second threshold, then the interface 330 may warn the signer about providing select personal information, such as their social security number or credit card number. Similarly, if the sender's trust score is below the second threshold, then the interface 330 may warn the signer about providing additional selected personal information, such as their phone number or home address in addition to their social security number or credit card number. It should be recognized that various levels or thresholds of trust score may be used for various warnings about providing select personal information while signing a document.

Figure 4:
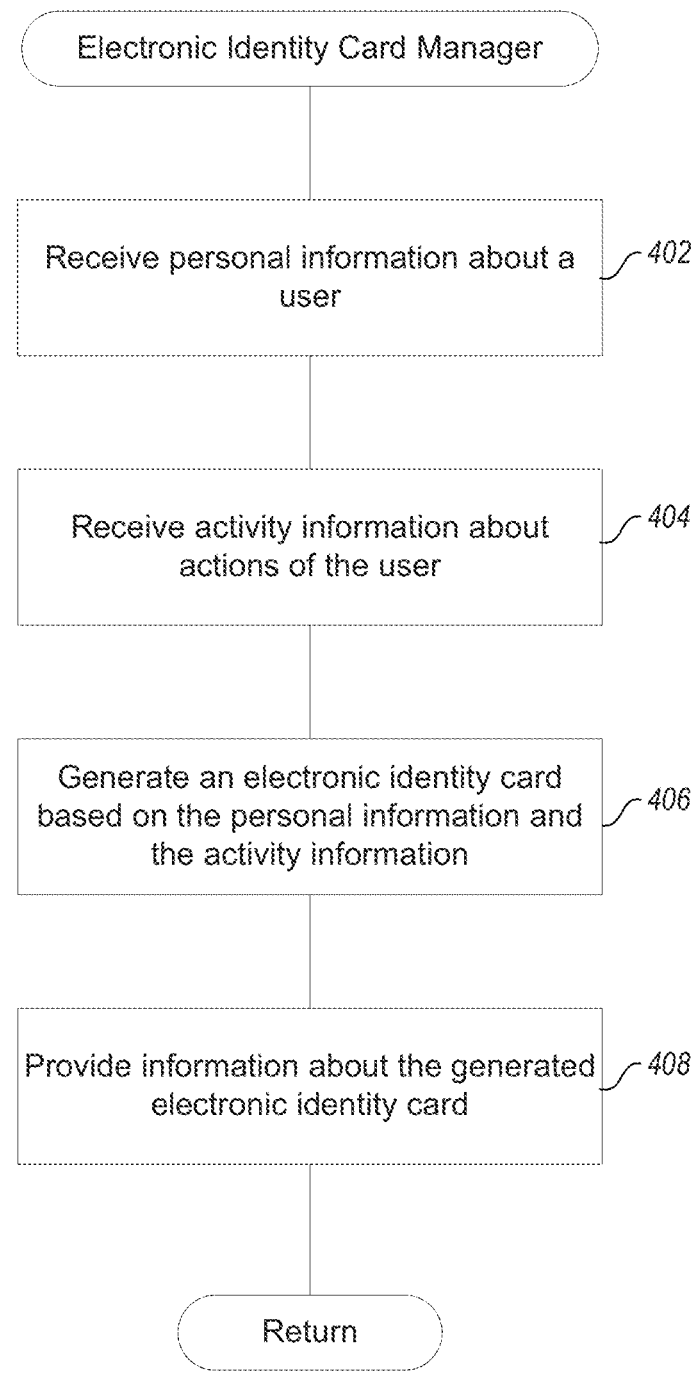
FIG. 4 is a flow diagram of an example electronic identity card management process.

FIG. 4 is a flow diagram of an example electronic identity card management process. The illustrated process may be performed by one or more modules of the ESS 110 described herein. Other embodiments may perform fewer or additional operations than those illustrated here.

The process begins at block 402, where it receives personal information about a user. Personal information may include one or more of name, address, telephone number, email address, photo, or the like.

At block 404, the process receives activity information about actions of the user. Activity information may include actions performed with respect to the electronic signature service, such as signature events, document sending, authentication events, or the like.

At block 406, the process generates an electronic identity card based on the personal information and the activity information. Generating the electronic identity card may include creating or updating a card based on the information received. In some cases, such as with the user's address, it may be included in the card directly. In other cases, the process may aggregate or analyze the received information. For example, the process may determine a score or other aggregate information based on the user's activities (e.g., types or number of authentication challenges met). The determined score may then be included in the card to indicate a level of trust, history, or experience with the electronic signature service.

At block 408, the process provides information about the generated electronic identity card. Providing information about the generated card may include providing (e.g., transmitting, sending) a textual or graphical representation of the card, or a reference thereto. In some cases, the card may be associated along with an electronic signature document, such as by including a URL or other reference to the card in the document.

Figure 5:
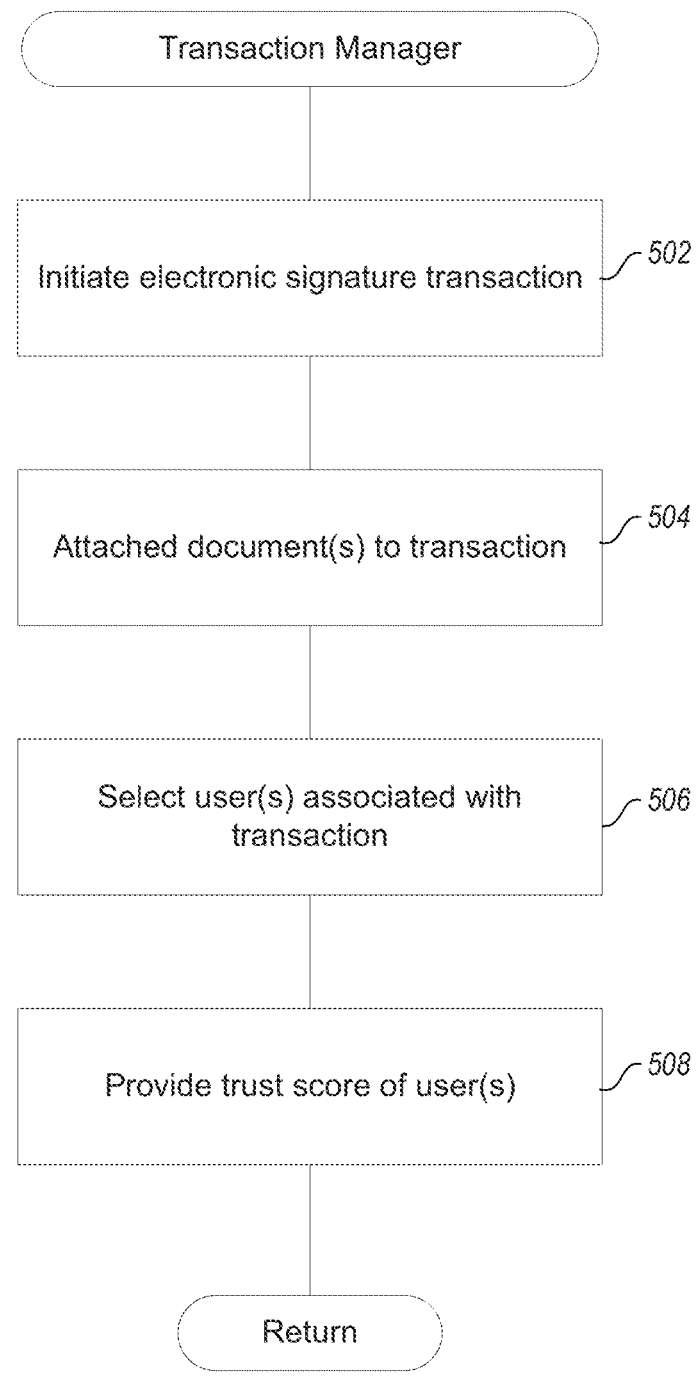
FIG. 5 is a flow diagram of an example electronic signature trust score process.

FIG. 5 is a flow diagram of an example electronic signature trust score process. The illustrated process may be performed by one or more modules of the ESS 110 described herein to enable initiation of a transaction and to provide a user with trust score of other users associated with the transaction. Other embodiments may perform fewer or additional operations than those illustrated here.

The process begins at block 502, where it initiates and/or otherwise generates an electronic signature transaction for a user (e.g., the sender or sending user).

At block 504, the process attaches one or more documents to the transaction. The user can add documents to the transaction by uploading them to the electronic signature service.

At block 506, the process selects one or more users associated with the transaction. These users may be the signing users of the transaction. The sending user can select the signing users by providing identifying information about the signing users, such as an email address.

At block 508, the process provides the trust score of the one or more signing users to the sending user. In some embodiments, the sender is provided with recommendations for the authentication mechanism for each of the signing users based on their corresponding trust score. The document is then sent to the signing users for electronic signature.

Figure 6:
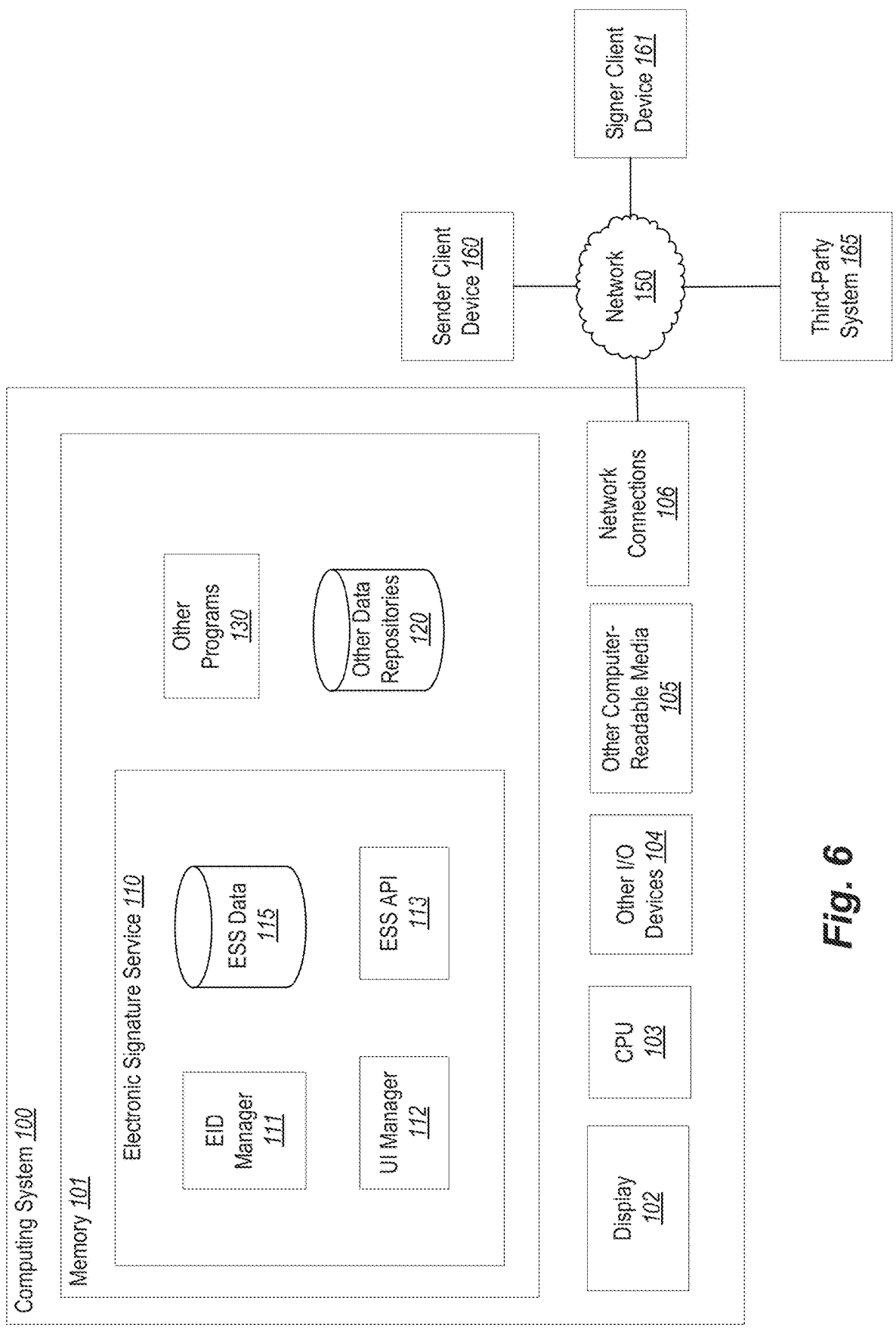
FIG. 6 is a block diagram of an example computing system for implementing an electronic signature service according to an example embodiment.

FIG. 6 is a block diagram of an example computing system for implementing an electronic signature service according to an example embodiment. In particular, FIG. 6 shows a computing system 100 that may be utilized to implement an electronic signature service 110.

Note that one or more general purpose or special purpose computing systems/devices may be used to implement the electronic signature service 110. In addition, the computing system 100 may comprise one or more distinct computing systems/devices and may span distributed locations. Furthermore, each block shown may represent one or more such blocks as appropriate to a specific embodiment or may be combined with other blocks. Also, the electronic signature service 110 may be implemented in software, hardware, firmware, or in some combination to achieve the capabilities described herein.

In the embodiment shown, computing system 100 comprises a computer memory ("memory") 101, a display 102, one or more Central Processing Units ("CPU") 103, Input/Output devices 104 (e.g., keyboard, mouse, CRT or LCD display, and the like), other computer-readable media 105, and network connections 106 connected to a network 150. The electronic signature service 110 is shown residing in memory 101. In other embodiments, some portion of the contents, some or all of the components of the electronic signature service 110 may be stored on and/or transmitted over the other computer-readable media 105. The components of the electronic signature service 110 preferably execute on one or more CPUs 103 and manage electronic signature processes and EID cards as described herein. Other code or programs 130 (e.g., an administrative interface, a Web server, and the like) and potentially other data repositories, such as data repository 120, also reside in the memory 101, and preferably execute on one or more CPUs 103. Of note, one or more of the components in FIG. 6 may not be present in any specific implementation. For example, some embodiments may not provide other computer readable media 105 or a display 102.

The electronic signature service 110 includes an electronic identity ("EID") card manager 111, a user interface ("UI") manager 112, an electronic signature service application program interface ("API") 113, and an electronic signature service data store 115.

The EID manager 111 includes logic configured to perform identity card management functions of the ESS 110, as described above. Functions of the EID manager 111 may include generating new identity cards, managing or modifying existing identity cards, authenticating users (or providing access to related authentication services), identity card use/activity tracking, scoring, and the like.

The UI manager 112 provides a view and a controller that facilitate user interaction with the electronic signature service 110 and its various components. For example, the UI manager 112 may provide interactive access to the electronic signature service 110, such that users can upload or download documents for signature, create and manage EID cards, and the like. In some embodiments, access to the functionality of the UI manager 112 may be provided via a Web server, possibly executing as one of the other programs 130. In such embodiments, a user operating a Web browser (or other client) executing on one of the client devices 160 or 161 can interact with the electronic signature service 110 via the UI manager 112.

The API 113 provides programmatic access to one or more functions of the electronic signature service 110. For example, the API 113 may provide a programmatic interface to one or more functions of the electronic signature service 110 that may be invoked by one of the other programs 130 or some other module. In this manner, the API 113 facilitates the development of third-party software, such as user interfaces, plug-ins, news feeds, adapters (e.g., for integrating functions of the electronic signature service 110 into Web applications), and the like. In addition, the API 113 may be in at least some embodiments invoked or otherwise accessed via remote entities, such as the third-party system 165, to access various functions of the electronic signature service 110. For example, a social networking service executing on the system 165 may obtain information about EID cards managed by the ESS 110 via the API 113.

The data store 115 is used by the other modules of the electronic signature service 110 to store and/or communicate information. The components of the ESS 110 use the data store 115 to securely store or record various types of information, including documents, signatures. EID cards, activity information, and the like. Although the components of the ESS 110 are described as communicating primarily through the data store 115, other communication mechanisms are contemplated, including message passing, function calls, pipes, sockets, shared memory, and the like.

The electronic signature service 110 interacts via the network 150 with client devices 160 and 161, and third-party systems 165. The third-party systems 165 may include social networking systems, third-party authentication or identity services, identity information providers (e.g., credit bureaus), or the like. The network 150 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 150 may be or include multiple distinct communication channels or mechanisms (e.g., cable-based and wireless). The client devices 160 and 161 include personal computers, laptop computers, smart phones, personal digital assistants, tablet computers, and the like.

In an example embodiment, components/modules of the electronic signature service 110 are implemented using standard programming techniques. For example, the electronic signature service 110 may be implemented as a "native" executable running on the CPU 103, along with one or more static or dynamic libraries. In other embodiments, the electronic signature service 110 may be implemented as instructions processed by a virtual machine that executes as one of the other programs 130. In general, a range of programming languages known in the art may be employed for implementing such example embodiments, including representative implementations of various programming language paradigms, including but not limited to, object-oriented (e.g., Java, C-++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the electronic signature service 110, such as in the data store 115, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 118 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the electronic signature service 110 may be implemented or provided in other manners, such as at least partially in firmware and/or hardware, including, but not limited to one or more application-specific integrated circuits ("ASIC's"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
accessing, by an electronic signature server, document information describing one or more documents with which a user has historically interacted;
determining, by the electronic signature server, a trust score for the user based on the document information describing the one or more documents; and
in response to the trust score being above a trust score threshold, causing display, by the electronic signature server on a display communicatively coupled to a client device of the user, an indication that the user is a trusted user in association with a new electronic signature transaction associated with the user via the electronic signature server, the new electronic signature transaction associated with an authentication method selected based on the determined trust score.

2. The method of claim 1, wherein the trust score is determined further based on one or more of: a type of signature used by the user to sign the one or more documents, a number of the one or more documents signed by the user, and a frequency of signing operations conducted by the user.

3. The method of claim 1, wherein the trust score is determined further based on one or more of: a number of sending events in which the user is a sender, a type of sending events in which the user is a sender, a frequency of sending events in which the user is a sender, a number of authentication methods used by the user in sending a document, and a type of authentication methods used by the user in sending a document.

4. The method of claim 1, wherein the document information includes one or more of: documents uploaded by the user to the electronic signature server, documents sent by the user via the electronic signature server, documents signed by the user via the electronic signature server, documents viewed by the user, and documents sent to the user via the electronic signature server.

5. The method of claim 1, wherein the trust score can be increased by the user providing a valid email address to the electronic signature server, by linking a social network account associated with the user with the electronic signature server, and by verifying an identity of the user with the electronic signature server.

6. The method of claim 1, wherein the new electronic signature transaction is associated with a warning selected based on the determined trust score to a second user associated with the new electronic signature transaction.

7. A non-transitory computer-readable storage medium storing executable instructions that, when executed by a hardware processor of an electronic signature server, cause the hardware processor to perform steps comprising:
   accessing, by the electronic signature server, document information describing one or more documents with which a user has historically interacted;
   determining, by the electronic signature server, a trust score for the user based on the document information describing the one or more documents; and
   in response to the trust score being above a trust score threshold, causing display, by the electronic signature server on a display communicatively coupled to a client device of the user, an indication that the user is a trusted user in association with a new electronic signature transaction associated with the user via the electronic signature server, the new electronic signature transaction associated with an authentication method selected based on the determined trust score.

8. The non-transitory computer-readable storage medium of claim 7, wherein the trust score is determined further based on one or more of: a type of signature used by the user to sign the one or more documents, a number of the one or more documents signed by the user, and a frequency of signing operations conducted by the user.

9. The non-transitory computer-readable storage medium of claim 7, wherein the trust score is determined further based on one or more of: a number of sending events in which the user is a sender, a type of sending events in which the user is a sender, a frequency of sending events in which the user is a sender, a number of authentication methods used by the user in sending a document, and a type of authentication methods used by the user in sending a document.

10. The non-transitory computer-readable storage medium of claim 7, wherein the document information includes one or more of: documents uploaded by the user to the electronic signature server, documents sent by the user via the electronic signature server, documents signed by the user via the electronic signature server, documents viewed by the user, and documents sent to the user via the electronic signature server.

11. The non-transitory computer-readable storage medium of claim 7, wherein the trust score can be increased by the user providing a valid email address to the electronic signature server, by linking a social network account associated with the user with the electronic signature server, and by verifying an identity of the user with the electronic signature server.

12. The non-transitory computer-readable storage medium of claim 7, wherein the new electronic signature transaction is associated with a warning selected based on the determined trust score to a second user associated with the new electronic signature transaction.

13. An electronic signature server comprising a hardware processor and a non-transitory computer-readable storage medium storing executable instructions that, when executed by the hardware processor, cause the hardware processor to perform steps comprising:
   accessing document information describing one or more documents with which a user has historically interacted;
   determining a trust score for the user based on the document information describing the one or more documents; and
   in response to the trust score being above a trust score threshold, causing display on a display communicatively coupled to a client device of the user, an indication that the user is a trusted user in association with a new electronic signature transaction associated with the user via the electronic signature server, wherein the new electronic signature transaction is associated with an authentication method selected based on the determined trust score.

14. The electronic signature server of claim 13, wherein the trust score is determined further based on one or more of: a type of signature used by the user to sign the one or more documents, a number of the one or more documents signed by the user, and a frequency of signing operations conducted by the user.

15. The electronic signature server of claim 13, wherein the trust score is determined further based on one or more of: a number of sending events in which the user is a sender, a type of sending events in which the user is a sender, a frequency of sending events in which the user is a sender, a number of authentication methods used by the user in sending a document, and a type of authentication methods used by the user in sending a document.

16. The electronic signature server of claim 13, wherein the document information includes one or more of: documents uploaded by the user to the electronic signature server, documents sent by the user via the electronic signature server, documents signed by the user via the electronic signature server, documents viewed by the user, and documents sent to the user via the electronic signature server.

17. The electronic signature server of claim 13, wherein the trust score can be increased by the user providing a valid email address to the electronic signature server, by linking a social network account associated with the user with the electronic signature server, and by verifying an identity of the user with the electronic signature server.

18. The electronic signature server of claim 13, wherein the new electronic signature transaction is associated with a warning selected based on the determined trust score to a second user associated with the new electronic signature transaction.

\* \* \* \* \*